Figure 4:
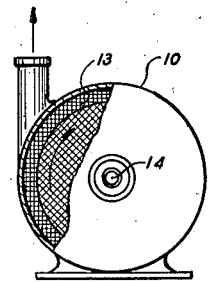

Nov. 17, 1936.    G. H. MEINZER    2,061,323
APPARATUS FOR STERILIZING AQUEOUS LIQUIDS
Filed July 30, 1934

G. H. MEINZER
INVENTOR
ATTORNEY

Patented Nov. 17, 1936

2,061,323

UNITED STATES PATENT OFFICE 2,061,323

APPARATUS FOR STERILIZING AQUEOUS LIQUIDS

Gotthold Harry Meinzer, Glendale, Calif., assignor to California Consumers Corporation, Los Angeles, Calif., a corporation of California Application July 30, 1934, Serial No. 737,684

5 Claims. (Cl. 204—24)

An object of my invention is to provide an apparatus adapted to the cheap, rapid, and complete sterilization of water and other aqueous liquids.

An object of my invention is to provide an apparatus in which water and other aqueous liquids may be rendered sterile without producing any change in their color, taste or odor.

An object of my invention is to provide an apparatus in which large quantities of water may be sterilized with great rapidity and at the minimum cost for apparatus and for power and materials consumed.

It is well known that bacteria and other low forms of life in water may be destroyed and the water rendered sterile by long continued contact with surfaces of gold, silver, and copper, the metal itself passing into solution.

It is also well known that where a trifling amount of low voltage direct electrical current is passed through the water, using a silver plate as the anode, the rapidity of solution and of sterilization is very materially increased.

I have discovered that by forming the silver (or other metallic) surface in the shape of a screen, perforated plate or other form in which the surface is interrupted, and passing this surface through the water to be treated at such velocity as to set up a high degree of turbulence directly on the contact surface, I am enabled to produce metallic solutions of the necessary degree of concentration, at a commercially rapid rate, without having recourse to the use of electric current, and that when the effects of turbulence and electrolysis are combined the solution is produced with extreme rapidity.

The invention of method is fully described and claimed in a copending application filed by me on July 30, 1934 under Serial No. 737,865, and will not be referred to herein except in so far as may be required to explain the usefulness of the various types of apparatus proposed and to which the present application is limited.

The basic requirement in an apparatus for this purpose is the ability to move the liquid over the metallic surface (i. e., the surface of which solution is desired) at a very high velocity and with an abrupt change in the direction of movement of the liquid. It is obvious that, given an interrupted surface of any character, it is entirely equivalent to move the surface through the liquid or to move the liquid over the surface, so far as the attainment of the desired result is concerned. When we reflect, however, that the mass of the body on which the metallic surface is formed is a minute fraction of the mass of liquid which it is to treat, it will be evident that the power required to raise the entire body of liquid to the required velocity is very much greater than the power consumed in moving the surface through the liquid at rest, and for this reason alone the forms of apparatus proposed are such as move the metallic surface through a stream of liquid moving at only such velocity as to pass it through the zone of treatment in the period required for completion of the treatment.

Figure 5:
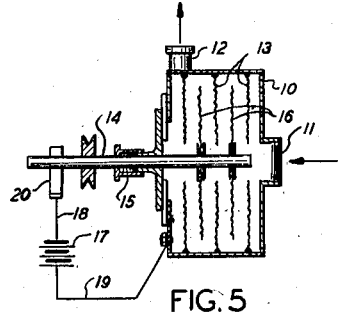
Figure 6:
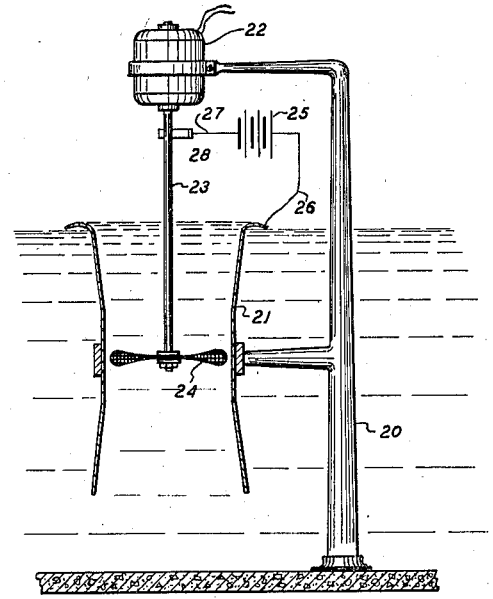
Figure 7:
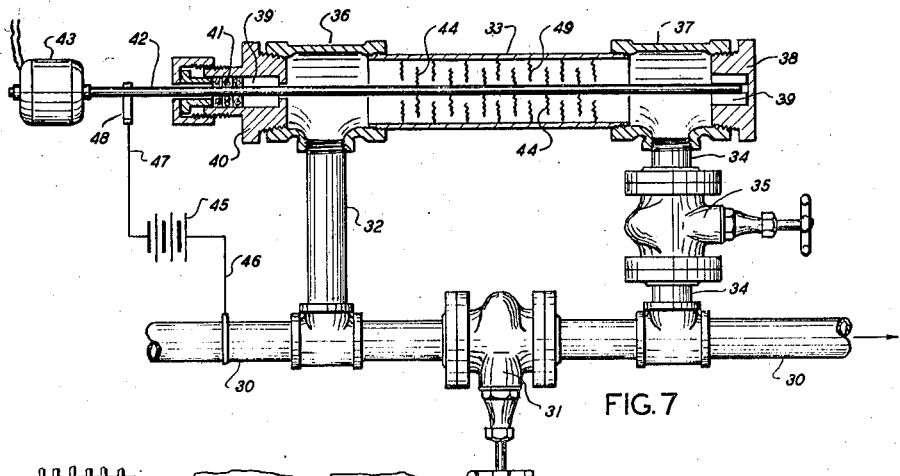
Figure 1:
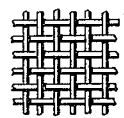
Figure 2:
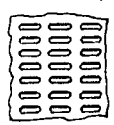
Figure 3:
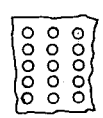

In the attached drawing, Figs. 1, 2, and 3 illustrate materials which may be used for the contact surfaces; Figs. 4 and 5 illustrate a form of apparatus which simultaneously treats and pumps the water; Fig. 6 illustrates a form of apparatus suitable for circulating large quantities of water under substantially no head, and Fig. 7 illustrates an apparatus adapted to treat a portion of a stream and return it for intermixture with the stream from which it was withdrawn.

As disclosed in the copending application, I prefer to form the contacting surface of woven wire screen, which may be made of wires of the preferred metal or may be of hard brass wire electroplated with the preferred metal. A screen of this type is shown in Fig. 1 of the drawing. The thickness of the wire will be determined by the requirement for rigidity and will vary with the diameter of the moving surface and the speed at which it is to be moved. Up to say 6" or 8" diameter, screens arranged to be revolved in their own plane may be made of No. 28 American gauge hard brass wire woven to six meshes per inch. In place of woven wire it is permissible to use slotted screen, as shown in Fig. 2, or punched screen, as shown in Fig. 3, but in both cases the thickness of the metal should at least equal the diameter of the wire which would be required to form a woven screen of corresponding strength. These materials are generically described in the claims as "foraminous surfaces".

The apparatus shown in diagrammatic form in Figs. 1 and 2 is designed to simultaneously treat the water by contact with the metal and to move it against a low hydraulic head from one point to another. In this apparatus 10 represents the case of a centrifugal pump provided with a suction 11 and a discharge opening 12. Within the case of the pump are fixed a plurality of screens 13 which, if an electrolytic effect is to be used, are electrically grounded to the case. Shaft 14 is provided with driving means not shown and passes through the stuffing box 15 into the pump body. In place of the conventional runners I provide a shaft with a plurality of screen discs 16 arranged to rotate with the shaft. If the treatment is to include the step of electrolysis, a low voltage battery 17 or other source of direct current at from 1.3 to 3.7 volts in connected through the wires 18 and 19 and a brush 20 to the pump shaft and to the case of the pump, the shaft being insulated from the pump case in the stuffing box 15. This connection should be made in such a manner that the revolving screens 16 are the anode electrodes and the fixed screens 13 the cathodes.

The form of apparatus shown in Fig. 6 is designed particularly for the rapid treatment of very large volumes of water, as for example the contents of swimming pools. In this form a branched stand 20 supports a tubular element 21 and a small electric motor 22. The motor is provided with a long vertical shaft 23 at the bottom of which is affixed a propeller element 24 or a plurality of such elements in superposed position. These elements may be formed of any of the materials shown in Figs. 1, 2, and 3 and the pitch of the blades should be such as to produce a slow upward movement of the column of water within the tubular element 21 while the propeller blades are passing through this column at a relatively high speed. To produce an electrolytic effect, if desired, a battery 25 or its equivalent may be connected through wires 26 and 27 and a brush 28 between the tubular element and the motor shaft 23, the motor case being insulated from the stand 20 and the connection being made in such manner that the propeller blades function as anodes.

The form of apparatus shown in Fig. 7 is adapted to the treatment of a relatively small proportion of a flow stream of water and the blending of this treated portion with the remainder of the stream. The main stream passes through a pipe 30 which is provided with a regulating valve 31. A by-pass around this valve consists of pipes 32, 33, and 34, pipe 34 being provided with a regulating valve 35 and pipe 33 being preferably of materially greater diameter than pipe 30. The enlarged pipe 33 functions as a treatment chamber and may be connected to pipes 32 and 34 by the T fittings 36 and 37 or in any other suitable manner.

In one of these T fittings, for example the fitting 37, I place a plug fitting 38 within which is a bearing 39 electrically insulated from the plug in any convenient manner not shown. In the opposite T fitting, as for example 36, I place a stuffing box fitting 40 provided with packing 41 and so arranged as to insulate the shaft 42 from the metal of the stuffing box. A motor 43 is arranged to drive the shaft 42 which is provided with a plurality of screen or perforated metal discs 44—44 arranged to rotate with the shaft, these discs being formed of or plated with the metal which is to be dissolved. A battery 45 or its equivalent is connected through wires 46 and 47 and a brush 48 with any convenient portion of the pipe system 30—32—33—34 and the shaft 42 in such manner that the rotating discs 44 act as anodes. It is desirable also to place within pipe 33 a corresponding number of cathode screen elements 49 electrically connected to pipe 33.

In the structure shown in Fig. 7 the water or other liquid to be treated is passed through pipe 30 under a superatmospheric pressure created by an outside source not shown. A desired proportion of the liquid passing through pipe 30 is diverted through the by-pass by suitable regulation valves 31 and 35, the velocity through the by-pass being so controlled that the proportion of the total stream flowing through the by-pass will be treated to the desired extent. This desired treatment of the by-pass water is such as will produce a concentration of dissolved silver in the by-pass water sufficient to produce sterilization of the entire stream flowing through pipe 30 when the by-pass water is returned to and intermixed with the main stream.

I claim as my invention:

1. Apparatus for sterilizing water by contact with a metal selected from a group consisting of gold, silver and copper, said group comprising: a case arranged for the passage of water therethrough in a vertical direction; propeller blades of wire mesh screen arranged for rotation within said case in a substantially horizontal plane, the surfaces of said screen being composed of said metal, and means for mechanically rotating said blades at a speed sufficient to produce turbulence immediately adjacent the surfaces of the wires composing said screen and a relatively slow vertical movement of water within said case.

2. Apparatus for sterilizing water by contact with a metal selected from a group comprising gold, silver and copper, said apparatus comprising: a cylindrical case; a shaft longitudinally disposed in said case; a plurality of fixed discs having surfaces composed of said metal, said discs being arranged across said case and having central openings surrounding said shaft; a plurality of revolving discs having surfaces of said metal and affixed to said shaft in planes normal to its axis, said revolving discs being positioned alternating said fixed discs and being of less diameter than said case; means for maintaining a potential difference between said fixed discs and said revolving discs; means for rapidly revolving said shaft and said revolving discs, and liquid conducting means arranged to permit water to flow longitudinally through said case.

3. Apparatus substantially as and for the purpose set forth in claim 2, in which said revolving discs are foraminous.

4. Apparatus substantially as and for the purpose set forth in claim 2, in which said revolving discs are of wire mesh screen.

5. Apparatus substantially as and for the purpose set forth in claim 2, in which said liquid conducting means comprises an inlet pipe entering an end of said case at substantially its center and an outlet pipe communicating with said case at a point on its periphery.

GOTTHOLD HARRY MEINZER.